UNITED STATES PATENT OFFICE.

GUY EDWARDS, OF NEW YORK, N. Y.

FIRE-EXTINGUISHING COMPOUND.

SPECIFICATION forming part of Letters Patent No. 639,674, dated December 19, 1899.

Application filed October 12, 1899. Serial No. 733,344. (No specimens.)

*To all whom it may concern:*

Be it known that I, GUY EDWARDS, a citizen of the United States, residing in the borough of Manhattan, in the city and State of New York, have invented a certain new and useful Improvement in Fire-Extinguishing Compounds, of which the following is a specification.

My compound is of the class which is prepared and used in the form of a dry powder. I have discovered that it is practicable to employ gunpowder in the usual form of moderately-coarse grains, so mingled with finely broken or pulverized non-inflammable and carbonic-acid-producing material that the compound will remain stored an indefinite period without caking or otherwise changing and is in condition to be easily, rapidly, and widely diffused in the air contiguous to a fire and produce a great volume of fire-extinguishing gas. I propose to use hollow cylindrical cases of pasteboard or the like for containing the compound and provide means for hanging or otherwise holding such in conspicuous and easily-accessible places ready for easy use when a fire occurs, as has been long practiced with other dry compounds for this purpose.

To manufacture my compound, mix five parts (5) of carbonate of lime (if there is in it a small quantity of clean sand, as the dust from marble-sawing, there is no objection) and four and nineteen-twentieths ($4\frac{19}{20}$) parts of bicarbonate of soda and grind well together. If there is no sand in the carbonate of lime, some should be introduced in the mixture. If sand of the proper purity is not available, rock may be crushed and the finely-broken sharp fragments will serve still better. When these have been well worked together under conditions as dry as possible, one-twentieth part ($\frac{1}{20}$) of common coarse gunpowder is intimately mixed by agitating and pressing two or more times through a coarse riddle. The powder is then filled loosely into the cases and the ends of the cases closed and the whole exterior well coated with a waterproof varnish.

The sand or pulverized rock keeps the bicarbonate of soda from what is known as "caking."

The powder contains just sufficient of coarse grains of explosive to cause a rapid and thorough scattering of the carbonates and promotes the rapid production of the desired fire-killing carbonic-acid gas.

The compound is harmless, cheap, unchangeable, and peculiarly efficient.

The smell of the small portion of burned gunpowder is sufficient to give notice of the presence of the fire-killing gas and to warn all against remaining and breathing in spaces so filled.

I claim as my invention—

1. A fire-extinguishing compound in the form of a dry powder containing carbonate of lime, sand, bicarbonate of soda, in about the proportions specified.

2. A fire-extinguishing compound in the form of a dry powder containing carbonate of lime, sand, bicarbonate of soda, and gunpowder in the conditions described, inclosed in a moisture-proof casing adapted for storage and use as herein specified.

In testimony that I claim the invention above set forth I affix my signature in presence of two witnesses.

GUY EDWARDS.

Witnesses:
 J. B. CLAUTICE,
 C. A. WEED.